United States Patent
Satoh et al.

(10) Patent No.: US 7,869,358 B2
(45) Date of Patent: Jan. 11, 2011

(54) COMMUNICATION RELAY APPARATUS, INFORMATION MANAGEMENT SYSTEM, AND CONTROL METHOD AND PROGRAM THEREFOR

(75) Inventors: Masakazu Satoh, Tokyo (JP); Kazunari Suzuki, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 11/375,619

(22) Filed: Mar. 14, 2006

(65) Prior Publication Data
US 2006/0209893 A1    Sep. 21, 2006

(30) Foreign Application Priority Data
Mar. 17, 2005    (JP)    ............... 2005-077400

(51) Int. Cl.
*H04J 1/16*    (2006.01)
*H04J 3/16*    (2006.01)
*H04Q 11/00*    (2006.01)
*H04L 12/27*    (2006.01)

(52) U.S. Cl. .................. 370/230.1; 370/235; 370/386; 370/412; 370/468

(58) Field of Classification Search .............. 370/386, 370/323, 416, 235, 395
See application file for complete search history.

(56) References Cited

U.S. PATENT DOCUMENTS

| | | | | |
|---|---|---|---|---|
| 5,619,500 A | * | 4/1997 | Hiekali | 370/414 |
| 5,784,358 A | * | 7/1998 | Smith et al. | 370/230 |
| 5,920,701 A | * | 7/1999 | Miller et al. | 709/228 |
| 6,700,869 B1 | * | 3/2004 | Falco et al. | 370/230 |
| 6,765,871 B1 | | 7/2004 | Knobel et al. | |
| 6,859,437 B2 | * | 2/2005 | Miller et al. | 370/235 |
| 2003/0007455 A1 | * | 1/2003 | Kohzuki et al. | 370/230.1 |
| 2004/0071086 A1 | * | 4/2004 | Haumont et al. | 370/230 |
| 2004/0081108 A1 | * | 4/2004 | Kloth et al. | 370/299 |

FOREIGN PATENT DOCUMENTS

| | | |
|---|---|---|
| JP | 6197150 | 7/1994 |
| JP | 9191321 | 7/1997 |
| JP | 2000224180 A | 11/2000 |
| JP | 2002-223244 | 8/2002 |

\* cited by examiner

*Primary Examiner*—Melanie Jagannathan
(74) *Attorney, Agent, or Firm*—George R. McGuire; David B. Woycechowsky; Bond Schoeneck & King, PLLC (57) ABSTRACT

A communication relay apparatus, information management system, and control method and program therefor. The communication relay apparatus includes several communication ports, and that includes a communication relay section, a buffer, a control signal transmitting section, a bandwidth information acquiring section, and a transmission interval control section.

16 Claims, 7 Drawing Sheets

COMMUNICATION RELAY APPARATUS, INFORMATION MANAGEMENT SYSTEM, AND CONTROL METHOD AND PROGRAM THEREFOR

CROSS-REFERENCE TO RELATED APPLICATION

The present application claims priority to Japanese Patent Application Number 2005-077400, filed with the Japan Patent Office on Mar. 17, 2005.

FIELD OF THE INVENTION

The present invention relates to a communication relay apparatus, an information management system, and a control method and program therefor. Particularly, the present invention relates to a communication relay apparatus that provides congestion control, an information management system, and a control method and a program therefor.

BACKGROUND OF THE INVENTION

A system has been put into practical use wherein servers or disk drives are connected by fiber channels, via a broad-band network, to create data backups in remote areas. According to this system, since data backups can be stored in remote locations that are less affected by natural disasters occurring at local areas, the possibility that data will be lost is extremely low. In this system, the bandwidth of the broad-band network is smaller than the bandwidth of a local network, and congestion may occur at a switching device that serves as a relay for the broadband network and the local network.

Conventionally, to prevent such congestion, a switching device is used that employs buffer credit for the performance of flow control (see, for example, Japanese Patent Publication number 2000224180A). According to buffer credit control, a notification is transmitted to a disk drive connected to the switching device concerning the remaining capacity of a communication data buffer provided for the switching device, and upon receiving this notification, the disk drive adjusts the transmission of frames so as not to exceed the number of credits. Thus, buffer overflow at the switching device can be prevented.

SUMMARY OF THE INVENTION

When a plurality of disk drives are connected to a switching device, a user may desire to allocate communication priorities in accordance with importance levels established for the individual disk drives. For example, when a disk drive on which data for the main business activities are recorded and another disk drive on which information to be provided is recorded are connected to the switching device, communication with the disk drive on which data for the main business activities are recorded should have the higher priority. On the other hand, when a communication channel has a satisfactorily large bandwidth, it should be used as fully as possible for communication, regardless of which disk drive has the higher priority.

Furthermore, as it is known in the art, information related to congestion must be transmitted by a device that detected the congestion to other devices one after another. Thus, between these devices, a new data frame must be defined for the transmission of congestion information, and the common use with the conventional technique is low.

Therefore, certain objects of the present invention are to provide a communication relay apparatus that can resolve the above described problems, an information management system and a control method and a program therefor. These objects can be achieved by combinations of the features described in the independent claims of the present invention. The dependent claims of the invention define specific examples that are additional advantages of the present invention.

To achieve these objects, according to one aspect of the present invention, there is provided a communication relay apparatus having a plurality of communication ports, that comprises:

a communication relay section, including at least one receiving side communication port which receives communication data from a transmission side apparatus and at least one transmitting side communication port which transmits the communication data to a receiving side apparatus, the communication relay section transmitting the communication data received from the transmission side apparatus through the receiving side communication port to a receiving side apparatus through the transmitting side communication port;

a buffer being connected with the transmission side communication port for storing the communication data before the transmission to the receiving side apparatus through the transmitting side communication port;

a control signal transmitting section for transmitting, in response to a transmission of the communication data from the buffer, a control signal representing a status in which an entry of the buffer is available to the transmitting side apparatus at a predetermined transmission interval;

a bandwidth information acquiring section for acquiring the bandwidth of the communication line connecting to the transmission side communication port; and a transmission interval control section for controlling the transmission interval in accordance with the bandwidth acquired by the bandwidth information acquiring section. Also, a method for controlling the communication relay apparatus, a program for controlling the communication relay apparatus, and an information management system including the communication relay apparatus are provided.

The overview of the invention does not enumerate all the features required for the invention, and sub-combinations of these features can also constitute the present invention.

According to the present invention, when a communication relay apparatus is connected to multiple communication lines having different communication bandwidths, congestion occurs less frequently.

DETAILED DESCRIPTION OF THE INVENTION

The present invention will now be described by referring to one embodiment. However, the following embodiment imposes no limitations on the invention described in the claims, and not all combinations of features explained in the embodiment are requisite for the invention.

Figure 1:
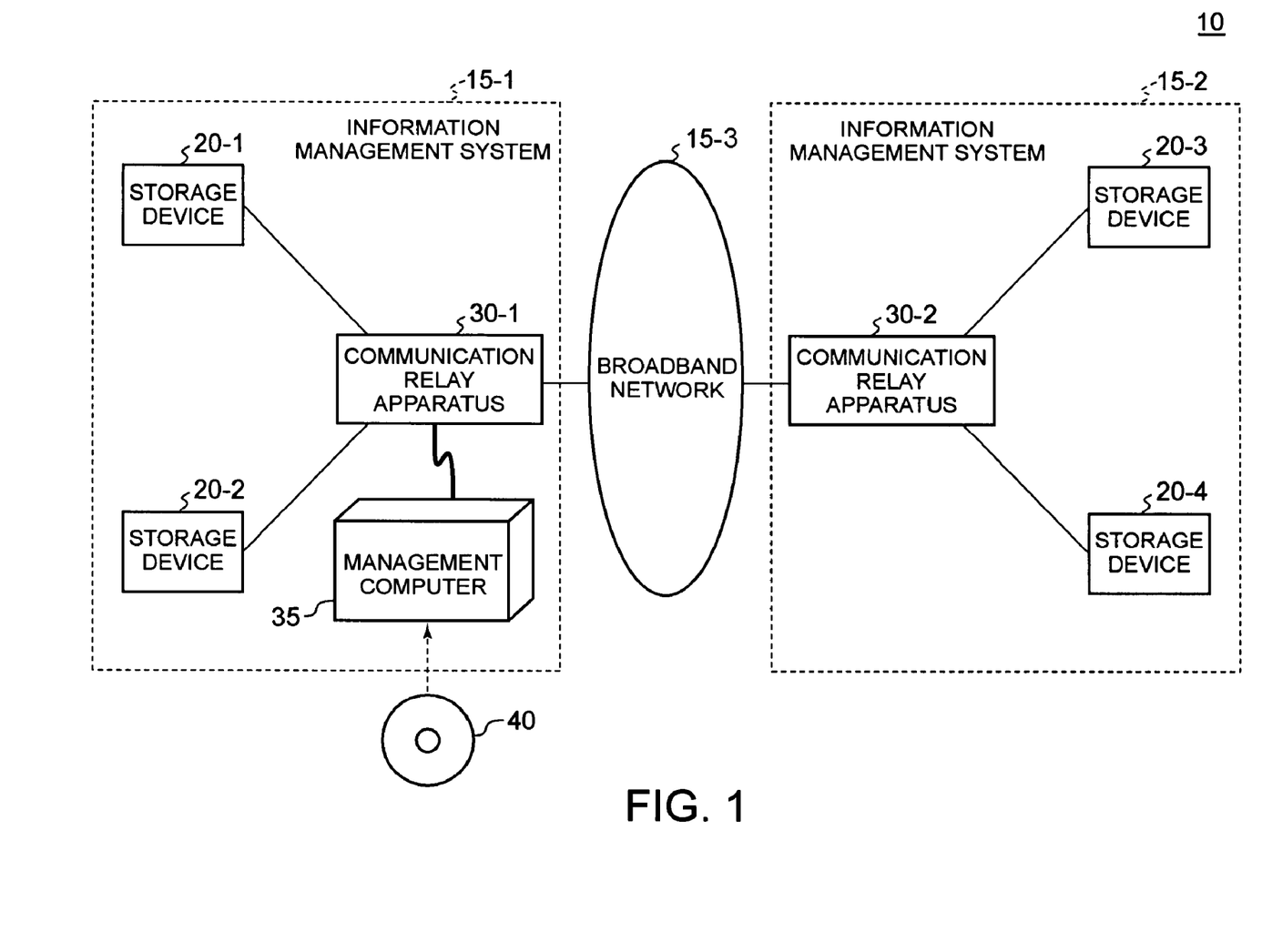
FIG. 1 is a diagram showing the general configuration of a communication network.

The general configuration of a communication network 10 is shown in FIG. 1. The communication network 10 includes: an information management system 15-1 and an information management system 15-2, which are mutually connected via a broadband network 15-3. The information management system 15-1 includes a storage device 20-1, a storage device 20-2, a communication relay apparatus 30-1 and a management computer 35. The communication relay apparatus 30-1 connects the storage device 20-1 and the storage device 20-2 to the broadband network 15-3 using communication lines that conform, for example, to fiber channel standards. The management computer 35 reads, from a recording medium such as a CD-ROM 40, a program that provides control for the communication relay apparatus 30-1, which is permitted to record or execute the program. The information management system 15-2 includes a storage device 20-3, a storage device 20-4 and a communication relay apparatus 30-2. The communication relay apparatus 30-2 connects the storage device 20-3 and the storage device 20-4 to the broadband network.

The storage devices 20-1 and 20-2 transmit stored data to the storage devices 20-3 and 20-4 for recording therein, and when a failure occurs at either the storage device 20-1 or 20-2, to recover data, the storage devices 20-3 and 20-4 transmit the stored data to either the storage device 20-1 or 20-2. In this manner, according to the communication network 10 of this embodiment, since the storage devices 20-3 and 20-4 are employed as backups, in the event a failure occurs, loss of data can be prevented.

While taking into consideration large disasters, such as natural disasters, it is preferable that the information management system 15-1 be located at a remote area, far distant from the information management system 15-2. In this case, since the cost of long-distance communication via the broadband network is increased, the bandwidth employed tends to be narrow. On the other hand, since the information management system 15-1 is installed, for example, in an office building, the communication line between the storage device 20-1 and the communication relay apparatus 30-1 is shorter and has a larger bandwidth than the communication line for the broadband network. Thus, the communication relay apparatus 30-1 is connected to two types of communication lines, for which the communication bandwidths differ greatly.

In such a case, when communication data from the storage device 20-1 or 20-2 are transferred at an extremely high speed, the communication relay apparatus 30-1 can not immediately transmit these received data to the broadband network. As a result, data overflows at an output buffer 340 provided for the communication relay apparatus 30-1, and congestion occurs. The communication relay apparatus 30-1 of this embodiment is provided in order to effectively prevent such congestion.

Figure 2:
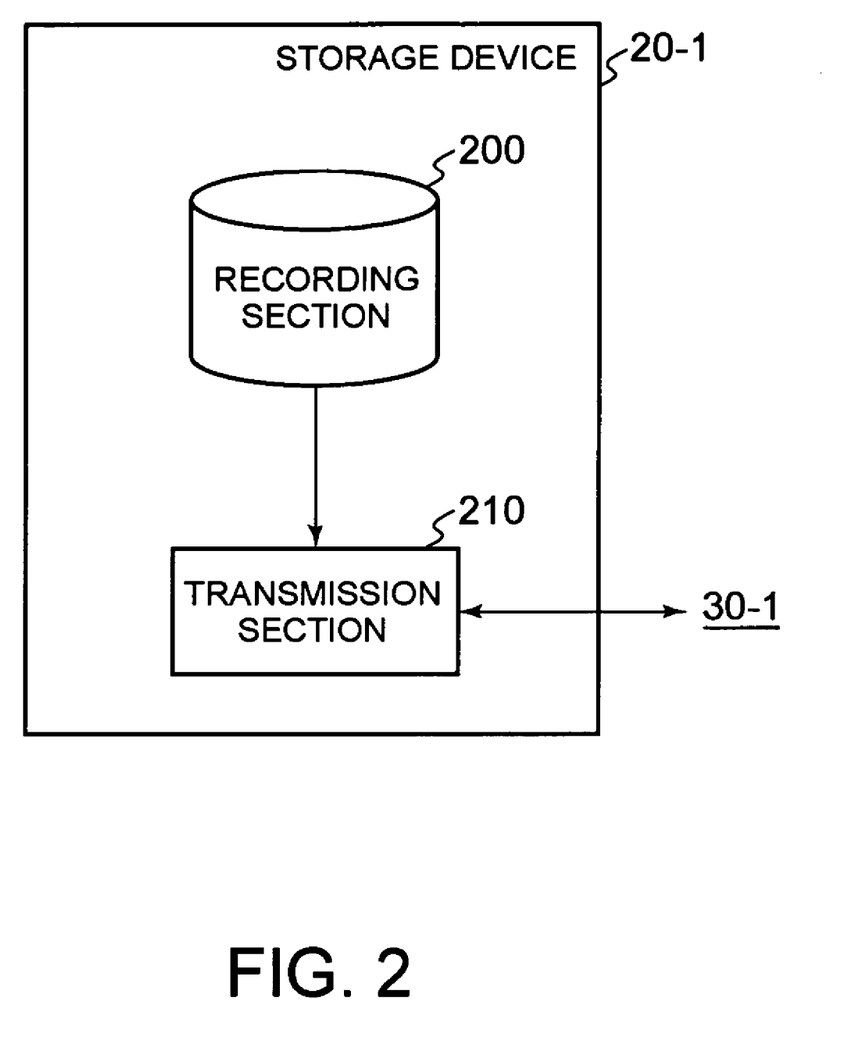
FIG. 2 is a functional block diagram showing a storage device.

The functional blocks of the storage device 20-1 are shown in FIG. 2. The storage device 20-1 includes a recording section 200, which is used to record data, and a transmission section 210. The transmission section 210 receives a control signal indicating that an entry in the output buffer 340 in the communication relay apparatus 30-1 is vacant, and then transmits, to the communication relay apparatus 30-1, data stored in the recording section 200. Thereafter, the data recorded in the recording section 200 are sequentially transmitted to the transmission section 210 and are then transmitted to the storage device 20-3 or 20-4. As a result, data stored in the recording section 200 can be backed up to either of the storage devices 20-3 and 20-4.

Figure 3:
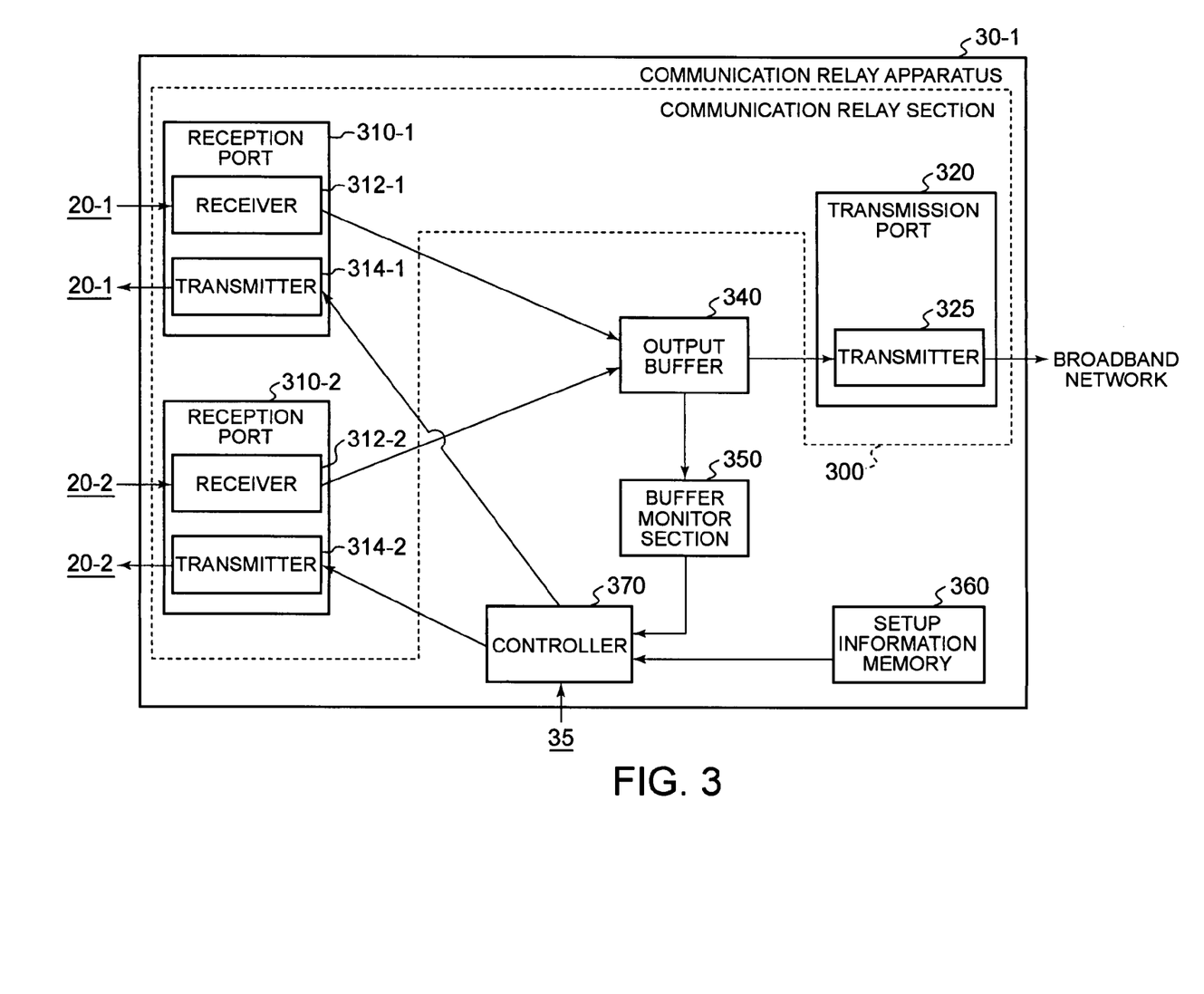
FIG. 3 is a functional block diagram showing a communication relay apparatus.

The functional blocks of the communication relay apparatus 30-1 are shown in FIG. 3. The communication relay apparatus 30-1 includes: a communication relay section 300, the output buffer 340, a buffer monitor section 350, a setup information memory 360, and a controller 370. The communication relay section 300 acts as a communication relay between the storage devices 20-1 and 20-2 and the storage devices 20-3 and 20-4. Specifically, first, the communication relay section 300 receives communication data from the storage devices 20-1 and 20-2 through reception ports 310-1 and 310-2. Then, the communication relay section 300 transmits the received communication data, through a transmission port 320, to one of the storage devices 20-3 and 20-4 on the reception side.

More specifically, the reception port 310-1 is connected to the storage device 20-1, and includes a receiver 312-1 and a transmitter 314-1. The receiver 312-1 stores, in the output buffer 340, communication data received from the storage device 20-1. The transmitter 314-1 transmits a control signal to the storage device 20-1 in accordance with an instruction received from the controller 370, and the reception port 310-2 is connected to the storage device 20-2 and includes a receiver 312-2 and a transmitter 314-2. The receiver 312-2 stores, in the output buffer 340, communication data received from the storage device 20-2, and the transmitter 314-2 transmits a control signal to the storage device 20-2 in accordance with an instruction received from the controller 370.

The transmission port 320 is connected to the broadband network and includes a transmitter 325, and the transmitter 325 reads communication data from the output buffer 340 and transmits the communication data to the broadband network. The output buffer 340 stores the communication data, which are received through the reception port 310-1 or 310-2 and are to be transmitted through the transmission port 320, and the buffer monitor section 350 detects the number of vacant entries in the output buffer 340 and transmits this count to the controller 370. Thereafter, the setup information memory 360 records a variety of information related to congestion control, such as the communication bandwidth of a broadband network, a reference value for the number of vacant entries used to detect congestion, and the maximum quantity of communication data that can be sequentially transferred to the communication relay apparatus 30.

The controller 370 controls intervals for the transmission of control signals from the reception ports 310-1 and 310-2.

Figure 4:
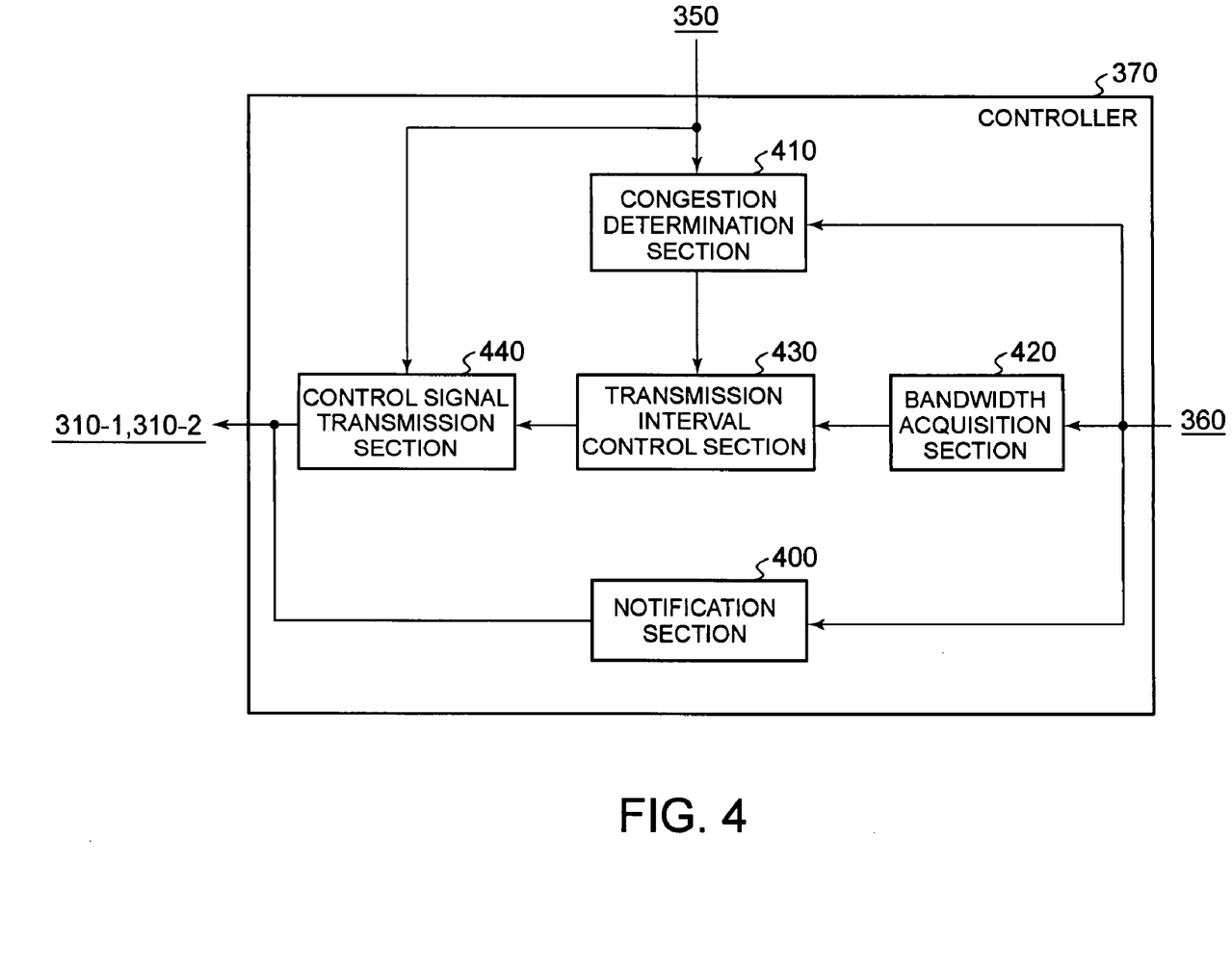
FIG. 4 is a functional block diagram showing a controller.

The functional blocks of the controller 370 are shown in FIG. 4. The controller 370 includes a notification section 400, a congestion determination section 410, a bandwidth acquisition section 420, a transmission interval control section 430 and a control signal transmission section 440. The notification section 400 provides for the storage devices 20-1 and 20-2 a predesignated value, smaller than the capacity of the output buffer 340, that is the maximum quantity of communication data that can be sequentially transmitted to the communication relay apparatus 30-1.

On condition that the number of vacant entries in the output buffer 340 becomes smaller than a predesignated reference value, the congestion determination section 410 determines that this is the result of communication congestion in the communication relay apparatus 30. The bandwidth acquisition section 420 then obtains the bandwidth of a communication line connected to the transmission port 320, i.e., the bandwidth of the broadband network. As the bandwidth, the bandwidth acquisition section 420 may obtain a value previously stored in the setup information memory 360, or may receive a bandwidth notification from an external device for performing bandwidth detection.

Based on the bandwidth obtained by the bandwidth acquisition section 420, the transmission interval control section 430 controls the intervals at which the control signal transmission section 440 sequentially transmits multiple control signals for a plurality of vacant entries. For example, when the bandwidth is 1 Mbps and the capacity of one entry is 100 kbit, the transmission interval control section 430 divides 100 k by 1 M, and designates a transmission interval timing of 0.1 second.

On condition that the communication relay section 300 has transmitted communication data from the output buffer 340, at a predetermined transmission interval designated by the transmission interval control section 430, the control signal transmission section 440 transmits, to the storage device 20-1 or 20-2, a control signal indicating an entry in the output buffer 340 is vacant.

Figure 5:
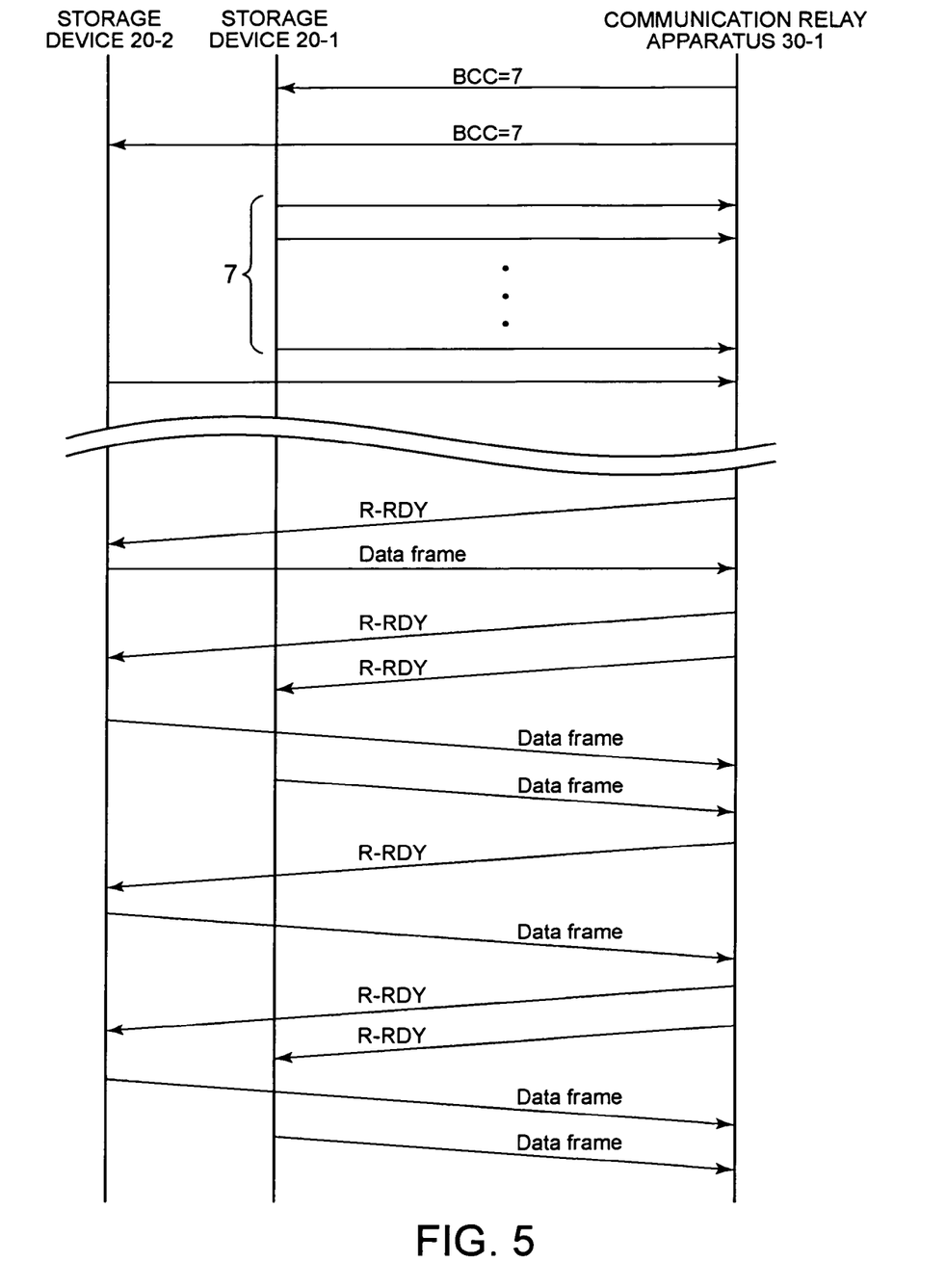
FIG. 5 is a time chart showing communication performed between storage devices and the communication relay apparatus.

FIG. 5 is a time chart for communication between the storage devices 20-1 and 20-2 and the communication relay apparatus 30-1. On condition that the storage devices 20-1 and 20-2 are accessed, the notification section 400 of the communication relay apparatus 30-1 provides for the storage devices 20-1 and 20-2 the maximum quantity of communication data that can be sequentially transferred (BCC=7). Preferably, the maximum data quantity is smaller than the maximum capacity of the output buffer 340, and in this embodiment, in FIG. 5, is set to 7, which is smaller than 16, the maximum capacity of the output buffer 340. With this arrangement, the occurrence can be prevented of a phenomenon wherein congestion is detected within an extremely short period of time and communication control is disabled.

On condition that circumstances are those whereunder there is no congestion, communication data are sequentially transmitted from the storage device 20-1 to the communication relay apparatus 30-1 at predesignated communication intervals (e.g., about several µ seconds). On the other hand, in circumstances whereunder there is congestion, on condition that communication data has been transmitted from the output buffer 340, the communication relay apparatus 30-1 transmits to the storage device 20-1 or 20-2 a control signal indicating an entry for the output buffer 340 is now vacant. This control signal is a R_RDY signal, for example, for a fiber channel. In response to receipt of this signal, the storage device 20-1 or 20-2 transmits communication data, as a data frame, to the communication relay apparatus 30-1.

Communication priorities are thereafter allocated to the reception ports 310-1 and 310-2 connected respectively to the storage devices 20-1 and 20-2. For example, in this embodiment, a higher priority is allocated the reception port 310-2 connected to the storage devices 20-2 than is allocated the reception port 310-1 connected to the storage devices 20-1. The priority rating allocated reflects, for example, a QOS (Quality of Service) level. More specifically, priority ratings may be defined based on relative and qualitative references, such as high, middle and low levels, or based on a quantitative reference, such as an average data rate or a guaranteed data rate. In any event, the control signal transmission section 440 of the communication relay apparatus 30-1 transmits a control signal to the reception port having the higher priority at a transmission interval that is shorter than that for the reception port having the lower priority. For example, within the period of time represented in FIG. 5, an R_RDY signal is transmitted to the storage device 20-1 only twice, while an R_RDY signal is transmitted to the storage device 20-2 four times.

Figure 6:
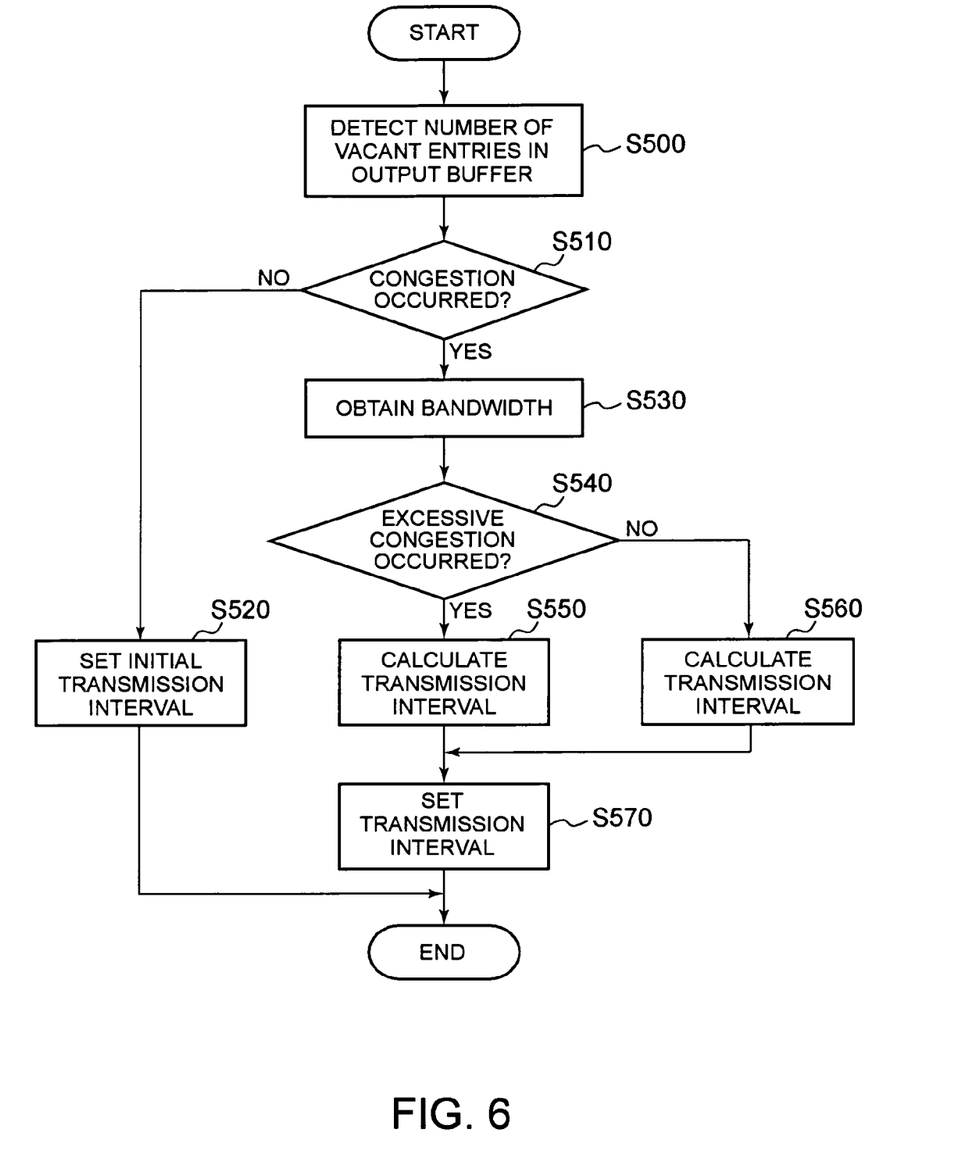
FIG. 6 is a flowchart showing the processing performed by the controller for setting a transmission interval.

FIG. 6 is a flowchart showing the processing performed by the controller 370 when setting a transmission interval. Following START, the buffer monitor section 350 detects the number of vacant entries in the output buffer 340 (S500). Then, the congestion determination section 410 determines whether the number of vacant entries in the output buffer 340 is smaller than a reference value, and decides whether communication performed by the communication relay apparatus 30 has become congested (S510). On condition that congestion is not detected (NO at S510), the transmission interval control section 430 sets a predesignated transmission interval (e.g., several µ seconds to several hundreds of µ seconds) that is shorter than the transmission interval that is designated on condition that congestion is detected (S520).

On condition that congestion is detected (YES at S510), the bandwidth acquisition section 420 obtains the bandwidth of a communication line connected to the transmission port 320 (S530). Then, if the number of vacant entries in the output buffer 340 is smaller than a designated excessive congestion reference value, which is smaller than the reference value, the congestion determination section 410, when determining whether congestion has occurred, determines that excessive congestion has occurred (S540). And in this case, since excessive congestion has been detected (YES at S540), the transmission interval control section 430 calculates a transmission interval (e.g., several m seconds to several hundreds of m seconds) that is longer than when excessive congestion has not been detected (S550).

In the event that excessive congestion is not detected (NO at S540), the transmission interval control section 430 employs the bandwidth to calculate a transmission interval (e.g., several m seconds to several hundreds of m seconds) that is longer than when congestion is not detected and is shorter than when excessive congestion is detected (S560). Thereafter, the obtained transmission interval is designated, by the transmission interval control section 430, for use by the control signal transmission section 440 (S570).

Figure 7:
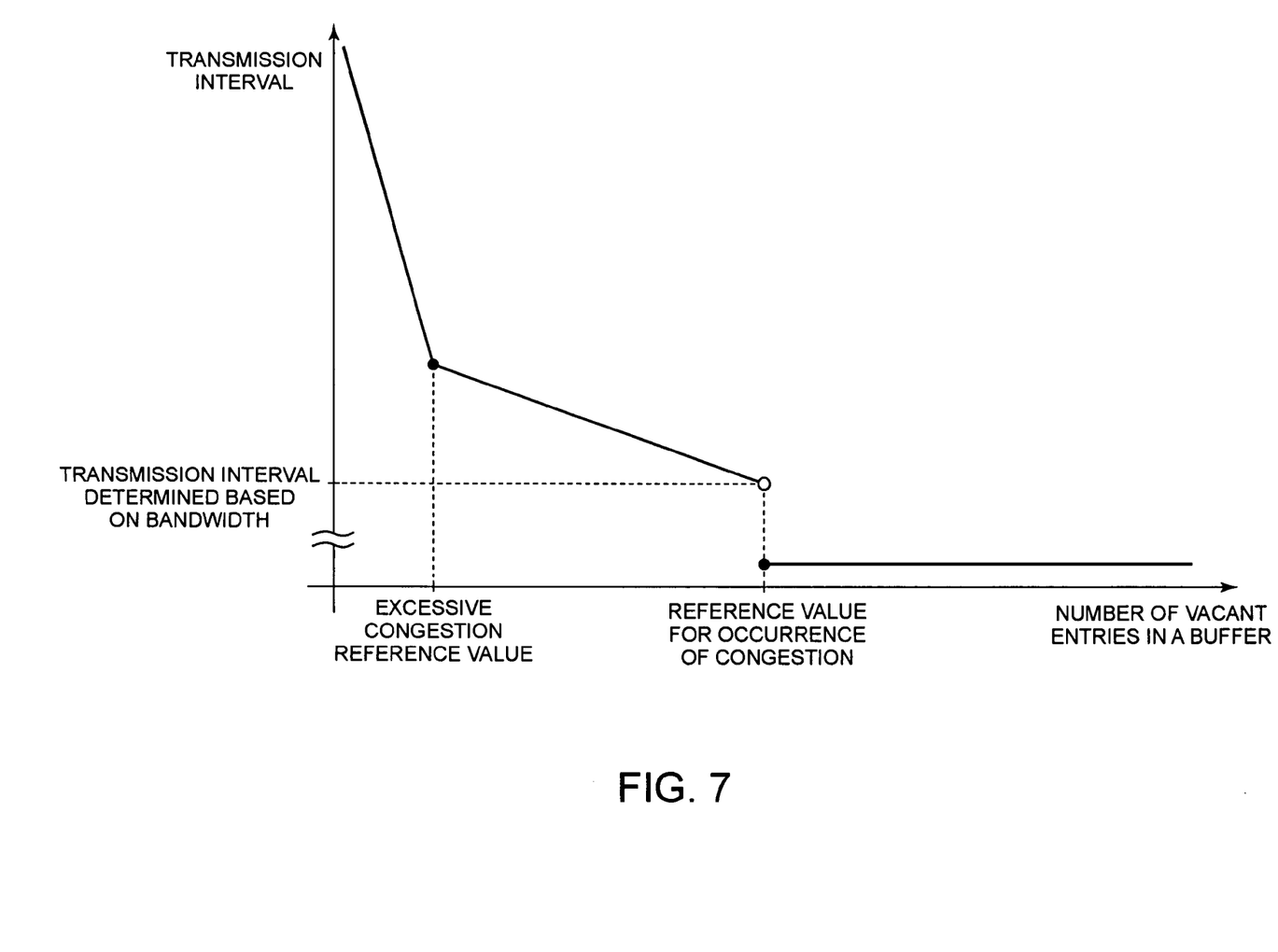
FIG. 7 is a graph showing a transmission interval the controller changes in accordance with the number of vacant entries in an output buffer.

FIG. 7 is a graph showing a transmission interval that the controller 370 changes in accordance with the number of vacant entries in the output buffer 340. In the example in FIG. 7, it is assumed that the bandwidth obtained by the bandwidth acquisition section 420 is a constant, regardless of the number of vacant entries in the output buffer 340. On condition that the number of vacant entries in the output buffer 340 is equal to or greater than the reference value, to determine whether congestion has occurred, the transmission interval control section 430 transmits a control signal at a predesignated transmission interval, regardless of the number of vacant entries in the output buffer 340.

On condition that the number of vacant entries in the output buffer 340 is smaller than the reference value for the occurrence of congestion, the transmission interval control section 430 designates a transmission interval (e.g., several m seconds to several hundreds of m seconds) that is longer than when congestion has occurred. Furthermore, the transmission interval controls section 430 extends the transmission interval on condition that the number of entries in the output buffer 340 is reduced, or shortens the transmission interval on condition that the number of entries is increased. Thus, on condition that the number of vacant entries is smaller than the reference value, the transmission interval control section 430 designates a transmission interval that is longer than when excessive congestion is not detected. Preferably, compared with when excessive congestion is not detected, the transmission interval control section 430 increases the incremental length of the transmission interval relative to the reduction in the number of vacant entries in the output buffer 340.

As described above, the transmission interval control section 430 designates a long transmission interval on condition that congestion is detected, and changes the incremental length of the transmission interval in accordance with the level of congestion. As a result, the transmission interval control section 430 can control the transmission interval, so that a relationship between the transmission interval and the number of vacant entries at the output buffer 340 is always a monotone decreasing function represented by a concave curve. Therefore, even when congestion is detected, the transmission interval can be appropriately controlled, the deterioration attributable to congestion can be prevented, and the congestion can easily be removed.

The present invention has been explained by employing the embodiment; however, the technical scope of the invention is not limited to this embodiment. Further, it will be obvious to one having ordinary skill in the art that the embodiment can be variously modified or altered. Therefore, embodiments that include such modifications or alterations are also included within the technical scope of the present invention.

What is claimed is:

1. A fiber channel communication relay apparatus for communicating data from a plurality of source storage devices over a broadband network to a plurality of destination storage devices, the fiber channel communication relay apparatus comprising:
   a plurality of reception ports respectively connected in data communication with the plurality of source storage devices, with each reception port comprising a receiver and a transmitter;
   an output buffer comprising a plurality of fiber channel data frame entries, with each entry being capable of storing a fiber channel data frame of data;
   a buffer monitor section;
   a controller comprising a congestion determination section, a transmission interval control section, a bandwidth acquisition section, a notification section and a control signal transmission section; and
   a transmission port comprising a transmitter;
   wherein:
   the buffer monitor section is structured, connected and programmed to detect a number of vacant fiber channel data frame entries in the output buffer;
   the bandwidth acquisition section is structured, connected and programmed to receive a bandwidth of the broadband network;
   the congestion determination section is structured, connected and programmed to receive the number of vacant fiber channel data frame entries from the buffer monitor section and to determine whether congestion exists when the number of vacant fiber channel data frame entries is smaller than a predesignated reference value;
   the transmission interval control section is structured, connected and programmed to receive the determination of congestion from the congestion determination section, to receive the bandwidth from the bandwidth acquisition section and to determine an interval of a control signal so that when congestion has been determined to exist then the interval is based upon bandwidth;
   the control signal transmission section is structured, connected and programmed to receive the interval from the transmission interval control section and to send control signals in series to the transmitters of the plurality of reception ports periodically according to the interval;
   the transmitters of the plurality of reception ports are each structured, connected and programmed to receive control signals from the control signal transmission section and to communicate each received control signal to the respective source data storage device corresponding to its reception port;
   the receivers of the plurality of reception ports are each structured, connected and programmed to receive a fiber channel data frames from the respective source data storage device, with each fiber channel data frame being received in response to a control signal sent by the transmitter of the reception port;
   the output buffer is structured, connected and programmed to receive fiber channel data frames from the receivers of the plurality of reception ports and to respectively store the received fiber channel data frames in its fiber channel data frame entries; and
   the transmitter of the transmission port is structured, connected and programmed to receive fiber channel data frames from the output buffer and to transmit the fiber channel data frames to the plurality of destination storage devices over the broadband network on a data frame by data frame basis.

2. The apparatus of claim 1 further comprising a setup information memory structured connected and programmed to send the bandwidth of the broadband network to the bandwidth acquisition section.

3. The apparatus of claim 1 wherein the bandwidth acquisition section is further structured, connected and programmed to receive the bandwidth of the broadband network from an external device.

4. The apparatus of claim 1 wherein the transmission interval control section is further structured, connected and programmed to determine an interval of a control signal so that when congestion has been determined to exist then the interval is equal to the capacity of a fiber channel data frame entry of the output buffer divided by the bandwidth.

5. The apparatus of claim 1 wherein the transmission interval control section is further structured, connected and programmed to determine the interval of the control signal so that when no congestion has been determined to exist then the interval is set at a predetermined value.

6. A fiber channel communication relay apparatus for communicating data from a plurality of source storage devices over a broadband network to a plurality of destination storage devices, the fiber channel communication relay apparatus comprising:
   a plurality of reception ports respectively connected in data communication with the plurality of source storage devices, with each reception port comprising a receiver and a transmitter;
   an output buffer comprising a plurality of fiber channel data frame entries, with each entry being capable of storing a fiber channel data frame of data;
   a buffer monitor section;
   a controller comprising a congestion determination section, a transmission interval control section, a bandwidth acquisition section, a notification section and a control signal transmission section; and
   a transmission port comprising a transmitter;
   wherein:
   the buffer monitor section is structured, connected and programmed to detect a number of vacant fiber channel data frame entries in the output buffer;
   the bandwidth acquisition section is structured, connected and programmed to receive a bandwidth of the broadband network;
   the congestion determination section is structured, connected and programmed to receive the number of vacant fiber channel data frame entries from the buffer monitor section and to determine whether congestion exists when the number of vacant fiber channel data frame entries is smaller than a predesignated reference value;

the transmission interval control section is structured, connected and programmed to receive the determination of congestion from the congestion determination section, to receive the bandwidth from the bandwidth acquisition section and to determine an interval of a control signal so that when congestion has been determined to exist then the interval is based upon bandwidth;

the control signal transmission section is structured, connected and programmed to receive the interval from the transmission interval control section and to send control signals in series to the transmitters of the plurality of reception ports periodically according to the interval;

the transmitters of the plurality of reception ports are each structured, connected and programmed to receive control signals from the control signal transmission section and to communicate each received control signal to the respective source data storage device corresponding to its reception port;

the receivers of the plurality of reception ports are each structured, connected and programmed to receive a fiber channel data frames from the respective source data storage device, with each fiber channel data frame being received in response to a control signal sent by the transmitter of the reception port;

the output buffer is structured, connected and programmed to receive fiber channel data frames from the receivers of the plurality of reception ports and to respectively store the received fiber channel data frames in its fiber channel data frame entries;

the transmitter of the transmission port is structured, connected and programmed to receive fiber channel data frames from the output buffer and to transmit the fiber channel data frames to the plurality of destination storage devices over the broadband network on a data frame by data frame basis;

the transmission ports of the plurality of transmission ports are respectively assigned priority values; and the control signal transmission section is further structured, connected and programmed to send control signals in series to the transmission ports in a periodic pattern depending upon the respective priority values of the plurality of transmission ports.

7. The apparatus of claim 6 further comprising a setup information memory structured connected and programmed to send the bandwidth of the broadband network to the bandwidth acquisition section.

8. The apparatus of claim 6 wherein the bandwidth acquisition section is further structured, connected and programmed to receive the bandwidth of the broadband network from an external device.

9. The apparatus of claim 6 wherein the transmission interval control section is further structured, connected and programmed to determine an interval of a control signal so that when congestion has been determined to exist then the interval is equal to the capacity of a fiber channel data frame entry of the output buffer divided by the bandwidth.

10. The apparatus of claim 6 wherein the transmission interval control section is further structured, connected and programmed to determine the interval of the control signal so that when no congestion has been determined to exist then the interval is set at a predetermined value.

11. The apparatus of claim 6 wherein the priority values are based, at least in part, upon Quality of Service levels.

12. A fiber channel communication system comprising:
a plurality of source storage devices;
a plurality of destination storage devices;
a broadband network;
a fiber channel relay apparatus for communicating data from the plurality of source storage devices over the broadband network to the plurality of destination storage devices, the fiber channel communication relay apparatus comprising:
  a plurality of reception ports respectively connected in data communication with the plurality of source storage devices, with each reception port comprising a receiver and a transmitter,
  an output buffer comprising a plurality of fiber channel data frame entries, with each entry being capable of storing a fiber channel data frame of data,
  a buffer monitor section,
  a controller comprising a congestion determination section, a transmission interval control section, a bandwidth acquisition section, a notification section and a control signal transmission section, and
  a transmission port comprising a transmitter;
wherein:
the buffer monitor section is structured, connected and programmed to detect a number of vacant fiber channel data frame entries in the output buffer;
the bandwidth acquisition section is structured, connected and programmed to receive a bandwidth of the broadband network;
the congestion determination section is structured, connected and programmed to receive the number of vacant fiber channel data frame entries from the buffer monitor section and to determine whether congestion exists when the number of vacant fiber channel data frame entries is smaller than a predesignated reference value;
the transmission interval control section is structured, connected and programmed to receive the determination of congestion from the congestion determination section, to receive the bandwidth from the bandwidth acquisition section and to determine an interval of a control signal so that when congestion has been determined to exist then the interval is based upon bandwidth;
the control signal transmission section is structured, connected and programmed to receive the interval from the transmission interval control section and to send control signals in series to the transmitters of the plurality of reception ports periodically according to the interval;
the transmitters of the plurality of reception ports are each structured, connected and programmed to receive control signals from the control signal transmission section and to communicate each received control signal to the respective source data storage device corresponding to its reception port;
the receivers of the plurality of reception ports are each structured, connected and programmed to receive a fiber channel data frames from the respective source data storage device, with each fiber channel data frame being received in response to a control signal sent by the transmitter of the reception port;
the output buffer is structured, connected and programmed to receive fiber channel data frames from the receivers of the plurality of reception ports and to respectively store the received fiber channel data frames in its fiber channel data frame entries; and
the transmitter of the transmission port is structured, connected and programmed to receive fiber channel data frames from the output buffer and to transmit the fiber channel data frames to the plurality of destination storage devices over the broadband network on a data frame by data frame basis.

13. The system of claim 12 further comprising a setup information memory structured connected and programmed to send the bandwidth of the broadband network to the bandwidth acquisition section.

14. The system of claim 12 wherein the bandwidth acquisition section is further structured, connected and programmed to receive the bandwidth of the broadband network from an external device.

15. The system of claim 12 wherein the transmission interval control section is further structured, connected and programmed to determine an interval of a control signal so that when congestion has been determined to exist then the interval is equal to the capacity of a fiber channel data frame entry of the output buffer divided by the bandwidth.

16. The system of claim 12 wherein the transmission interval control section is further structured, connected and programmed to determine the interval of the control signal so that when no congestion has been determined to exist then the interval is set at a predetermined value.

* * * * *